United States Patent Office 3,018,517
Patented Jan. 30, 1962

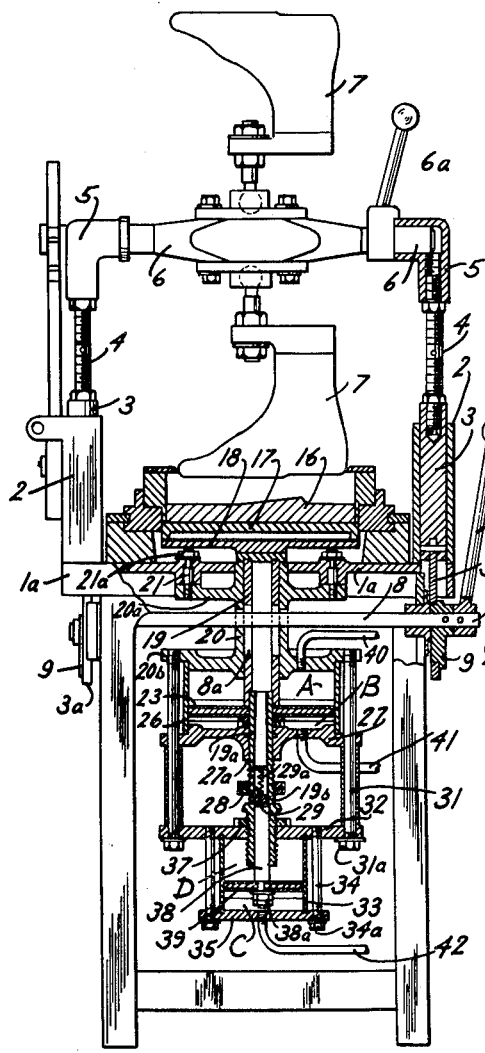

3,018,517
APPARATUS FOR FORMING FOAMED PLASTIC SOLES WITH CLOSED PORES AND FOR CONNECTING SAME TO ARTICLES OF FOOTWEAR
Herbert Ludwig, Desmastrasse 112, Uesen, Post Achim, near Bremen, Germany
Original application Feb. 26, 1959, Ser. No. 795,780. Divided and this application Nov. 16, 1959, Ser. No. 859,829
Claims priority, application Germany Mar. 4, 1958
3 Claims. (Cl. 18—17)

The present invention relates to an apparatus for the manufacture of soles consisting of foamed plastic material, and for simultaneous connection of such soles to different types of footwear. The foamed plastic soles to which this invention pertains are of the lightweight, closed or unicell type known in the trade under the names of "Microcell," "Porokrepp," "Zellkrepp," "Zellgummi," etc. (trademarks).

Heretofore, such lightweight foam rubber-like plastic materials were manufactured in the form of plates or sheets of uniform thicknesses. Soles were thereupon stamped from such sheets and glued to an article of footwear in separate operations. Only plates and soles of uniform thicknesses can be manufactured in accordance with all known prior procedures because it has been found that, when attempts are made to manufacture plates whose thicknesses vary in different zones thereof, the formation of pores or cells during expansion, too, is different and, hence, no homogeneous products of different thicknesses can be formed. This will be readily understood since, when a greater quantity of plastic material is concentrated in a certain zone of the product, it requires a greater degree of expansion in order to develop pores or cells of magnitudes corresponding to those of pores in relatively thin layers of the rubber-like foamed plastic product. This holds true regardless of the specific process according to which the formation of pores is brought about in the foamed plastic. This phenomenon has presented a grave problem to the manufacturers of porous products made of foamed plastic since all zones of molds utilized in shaping and vulcanizing of such materials are normally opened at a uniform rate, i.e. a mold in which certain zones would open more rapidly than other zones would become so complicated as to unduly increase the cost of the product.

Due to the above-enumerated peculiar characteristics of foamed plastics, no method and apparatus have been developed so far for directly connecting soles of such material to the upper parts of footwear in vulcanizing presses presently utilized for turning out shoes, boots and the like with porous lightweight soles of foam rubber-like plastic material.

The foamed plastic sole to which this invention pertains should not be confused with materials of the open- or interconnecting-cell type, known as sponge rubber, in which the relatively large openings or pores communicate with each other. Such spongy materials are produced in vulcanizing of certain types of slippers by utilizing compositions containing so-called "blowing" agents which develop open, interconnected pores during the expansion of the composition under heat and/or pressure. The disadvantage of soles made of sponge rubber-like material having relatively large interconnected openings or pores is in that they cannot resist abrasion; therefore, such materials, when utilized for the manufacture of soles on out-of-doors footwear, are coated with or connected to a compact layer of rubber-like material. Another distinction between the soles made of sponge rubber-like material and those made of foamed plastic with closed pores is in that a sponge rubber may be vulcanized to an article of footwear without pressure whereas the foamed plastic soles with closed pores, which are much more resistant to abrasion, require relatively high pressures during formation and vulcanization to the upper part of a shoe, boot or the like.

Referring further to the present state of art, only compact, i.e. non-porous, rubber-like soles are known to be formed and vulcanized to an article of footwear in a single operation, i.e. on the job, whereas in the manufacture of soles consisting of foam rubber-like material with non-communicating or closed pores, it was heretofore considered necessary that the material be formed into plates, a sole of uniform thickness stamped from such plates, and the sole thereupon connected to the upper part of a shoe and vulcanized in a further independent operation and in a separate machine.

An important object of the present invention is to provide an apparatus for forming and connecting porous foam rubber-like soles with different types of footwear in a simultaneous operation, i.e. "on the job."

Another important object of the invention is to provide an apparatus which is so constructed that the expansion of the plastic material, while the latter develops a plurality of non-connected closed pores and assume the form of a sole, occurs in a fully controlled manner.

A further object of the invention is to provide a vulcanizer for porous foam rubber-like soles which may be utilized with shoe lasts of different shapes and sizes.

A yet further object of the instant invention is to provide a machine which is so constructed that the porous sole applied therein to an article of footwear is of substantially uniform thickness.

A concomitant object of the invention is to provide an article of footwear comprising a sole of porous foam rubber-like material which latter is formed, applied to the article, and vulcanized in a series of rapidly following steps in a single machine, and which may incorporate materials other than a foamed plastic, such as cork, wood, felt, and the like.

The novel method consists essentially in that the starting material of which the porous foamed plastic sole is made is subjected to pressure and eventually heat while in contact with the upper part of an article of footwear to which the sole is to be applied, is thereupon permitted to expand under fully controlled conditions to develop closed pores and to assume the final shape of a sole, and is finally vulcanized, all such operations being performed sequentially in a single apparatus. Thus, the formation of a foam plastic sole occurs in two steps while the starting plastic composition is in contact with the upper part of the article of footwear, and is thereupon vulcanized in an immediately following operation.

According to a preferred embodiment of my method, the starting composition, i.e. a single plastic material or a mixture of plastic materials, is first liquefied under the influence of heat and pressure whereby its volume is reduced; the compressed composition is then permitted to expand to a controlled extent in order to develop closed pores; and the foamed plastic is finally vulcanized as a last step of the process. As before mentioned, the composition may contain fillers or inserts of wood, cork, felt or other suitable material, preferably of such configuration that the thickness of the porous sole is uniform in each of its zones, this insuring uniform development of pores or closed cells during the expansion stage. In addition, such inserts may prevent excessive heat transfer to the last and to the upper part of a shoe or boot mounted on the latter. The material of which the foamed plastic sole is made may be a urethane polymer, polystyrene, acetyl cellulose, and many others.

The important features of the novel vulcanizer for the practice of my method will be better appreciated by comparing same with known vulcanizing apparatus presently utilized in the manufacture and application of rubber-like soles to shoes, boots and other articles of footwear. Such prior apparatus comprise a mold having a movable section which is closed before the plastic composition is introduced into the mold cavity. The apparatus also comprises a last onto which a shoe or the like is placed and then moved into requisite position with respect to the mold. The bottom ram of the machine is then moved in a direction toward the last to apply pressure to the molding composition and, finally, when the vulcanization is completed, the movable section or sections of the mold are opened and the ram moved back into its starting position. Thus, no provision is made in known sole vulcanizers for moving the ram a predetermined distance from the last in order to insure controlled, uniform development of pores in the resilient sole, i.e. to increase the volume of the mold cavity to a certain extent in order to insure that the pores develop uniformly in all zones of the sole.

The novel vulcanizing apparatus for the practice of my method includes all component parts of prior machines and, in addition, features means for controlling the expansion of plastic material during the formation of closed pores therein. The construction of the apparatus is such that the means for controlling the expansion of plastic material during the formation of closed pores therein, preferably assuming the shape of a fluid-operated piston, prevents excessive return movements of the ram in one position thereof but allows the ram to return into its starting position in another position thereof. It is absolutely necessary to permit return movements of the ram into its starting position after each vulcanizing operation since this restores the original volume of the mold cavity for reception of a requisite supply of plastic material for the next sole-forming, connecting and vulcanizing operation.

A further feature of the novel apparatus resides in the provision of means, such as a threaded sleeve or the like, for adjusting the position of the device which controls the movements of the ram during expansion of the plastic composition.

An additional feature of the novel apparatus resides in the provision of means for synchronizing the movements and the position of the ram during expansion of the plastic, during subsequent vulcanization and during removal of the finished product, as well as the movements of the control means therefor. In such manner, the formation, application and vulcanization of a sole made of foamed plastic with closed pores may be performed in a fully automatic way and a series of such soles may be manufactured and applied to footwear in a continuous practically uninterrupted process.

The novel apparatus also comprises improved means for reciprocating, rotating and otherwise adjusting the position of one or more lasts with respect to the vulcanizing device proper. The latter comprises a frame defining a mold cavity, heating means therefor, a reciprocable ram movable toward and away from the frame, and preferably hydraulically or pneumatically operable means for moving the ram into and/or away from the mold cavity in the aforementioned frame. Means may be provided for assisting the expanding plastic material in bringing about movements of the ram away from the mold during the expansion stage, i.e. during the formation of closed pores in the sole, as well as means for preventing too rapid expansion of the plastic which could result in separation of the sole from the upper part of a shoe, boot or the like while the latter is supported by the last during the formation, application and vulcanization of the foam rubber-like sole.

By merely exchanging the last or lasts, and by providing a readily exchangeable mold, the machine may be utilized for the manufacture of soles in greatly different shapes and sizes.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings, in which:

FIG. 1 is somewhat schematic part elevational and part sectional view of the novel vulcanizer; and FIG. 2 is enlarged transverse section taken on line II—II of FIG. 1, as seen in the direction of arrows.

Referring now in greater detail to the drawing, the vulcanizing machine comprises a base or frame 1 including a horizontal top plate 1a which latter carries a pair of spaced bearings blocks 2. Blocks 2 slidably support drawbars 3 whose upper ends mesh with threaded coupling rods 4. The upper ends of rods 4 are threaded into bearings 5 rotatably supporting the ends of a horizontal cross shaft 6. By rotating the rods 4, the distance between the shaft 6 and the top plate 1a may be varied within a desired range. Shaft 6 supports a pair of diametrically opposed lasts 7. It will be readily understood that only one last or more than two lasts, may be carried by member 6 and, if the number of lasts exceeds two, the adjacent lasts are preferably equidistant from each other. The connection between each last 7 and the cross shaft 6 is preferably of the universal type, i.e. each last may be rotated and inclined with respect to as well as moved toward and away from the member 6. The latter is connected with a handgrip member or lever 6a by means of which a selected last 7 may be moved into position above the molding and vulcanizing apparatus proper, i.e. into close proximity of and above the table or top plate 1a.

Beneath the plate 1a, frame or base 1 supports a transverse shaft 8 whose function is to move lasts 7 toward and away from the top plate 1a. To that end, shaft 8 is mounted in a pair of spaced bearings carried by frame 1 at opposing sides thereof and is connected to a pair of eccentrics 9 each of which is received in the eye of a connecting link 3a. The upper ends of links 3a are connected for sliding movement with drawbars 3 in respective blocks 2. When the shaft 8 is rotated in its bearings by the actuating lever 10, eccentric elements 9 cause movements of parts 3, 3a, 4, 5, 6, 6a and 7 toward or away from the top plate 1a. When the shaft 8 is rotated in such direction as to move the cross shaft 6 towards the plate 1a, a selected last 7 whose position has been previously adjusted by lever 6a and by the setting of its connection with shaft 6 will move toward and partially into the frame or mold 11 which latter forms part of the vulcanizer proper and is carried by a heating box 12. Frame 11 and box 12 are separable into two halves in the longitudinal direction of lasts 7, and are slidably and preferably removably received in a guide frame 13. Means (not shown), such as articulately connected levers or a hydraulic device, may be provided for opening and closing parts 11 and 12 in directions transverse to the longitudinal direction of lasts 7 when the latter are in the position of FIG. 1.

The ram 16 with a heating attachment 17 therefor rests on a ram plate 18, the latter being connected for movements with a preferably hollow vertical piston rod 19. It will be noted that the upper side of ram 16 is of a contour complementary to that of the underside of a shoe sole, i.e., it has a recess for reception of a heel and a raised portion between the recess and the forward part thereof which latter underlies the outsole of a finished product. Rod 19 is formed with a pair of transversely aligned elongated closed slots 8a for the passage of transverse shaft 8 therethrough, and slides in a pair of vertically spaced flanges 20a, 20b which are preferably integral with or connected to a bushing 20. The upper flange 20a of bushing 20 is connected to the underside of top plate 1a by a number of bolts 21 and nuts 21a. As is shown at the upper end of FIG. 2, the rod 19 is held against rotation in bushing 20 by a key and groove connection 22, 22a or in any other suitable way. At its lower end, rod 19 is welded or otherwise rigidly connected to a smaller-diameter rod or bar 19a which latter carries a double-acting piston or plunger 23 fixed thereto by a disc 24 and a nut 25. Rods 19, 19a may be made of a single preferably hollow piece, if desired.

Plunger 23 is received in a two-way cylinder 26 whose upper end is sealed by the lower flange 20b of bushing 20, and whose lower end is sealed by a discoid cover or lid 27. The latter is formed with a hub 27a slidably receiving the reduced-diameter portion of composite piston rod 19, 19a. The lower end of member 19a is externally threaded, as at 19b, and is in meshing engagement with adjusting or lock nuts 28. The open lower extremity of member 19a is sealed by a disc 29. The lock nuts 28 act as a means for controlling the extent to which the ram 16 is movable in the direction toward the frame 11, i.e. to reduce the volume of the mold cavity. They may abut against the hub 27a when the composite rod 19, 19a is moved in upward direction by its piston 23.

Set bolts 31 and nuts 31a connect the lower flange 20b of bushing 20 with cylinder 26, cover 27, spacers 30 and a bottom plate 32. Stud bolts 34 and nuts 34a connect a second cylinder 33 to cover plate 32 in such manner that the cylinders 26 and 33 are coaxial with each other. Lower cylinder 33 is sealed at its lower end by a discoid end plate 35. Bottom plate 32 constitutes the upper end wall of cylinder 33 and coaxially receives in its tapped bore the externally threaded portion or stem 36a of a sleeve 36 which latter is held in position by a jam or lock nut 37. Sleeve 36 slidably guides a piston rod 38 whose reduced lower end portion is connected to a one-way piston or plunger 39 by means of nuts 38a or the like. The piston 39 is movable in its cylinder 33 in upward direction by a pressure medium which may be introduced into the lower cylinder space C through a conduit 42 from a suitable source (not shown). The upper cylinder space D in cylinder 33 communicates with the surrounding atmosphere through one or more bores 32a provided in bottom plate 32.

The cylinder spaces A, B in cylinder 26 above and below the plunger 23, respectively, as well as the lower cylinder space C in cylinder 33 below its plunger 39 are sealed from atmosphere by suitable gaskets, not shown. A pressure medium may be delivered from a non-represented source into cylinder spaces A, B through conduits 40, 41, respectively, and the flow of pressure medium into said spaces may be controlled by a suitable distributor valve system or the like. The pressure medium may be a gaseous or a hydraulic fluid.

The operation of the just described vulcanizer is as follows:

As a first step, the frame 11 and heating box 12 are closed by operating the aforementioned articulate or hydraulic means. The plunger 23, and hence the rod 19 as well as the ram 16, are in their lowermost positions, i.e. as shown in FIG. 1. In such position of the machine, ram 16 and frame 11 define an upwardly opening space or mold cavity for reception of a suitable plastic molding composition, e.g. a mixture of one or more vulcanizable plastic materials. Suitable inserts (not shown) may be placed atop the mixture in the mold cavity, the configuration of the inserts being such that the composition is preferably distributed in a layer of uniform thickness from the tip or toe, along the outsole and shank, and to the heel of the last, and more particularly, from the toe-cap to the counter of the upper shoe or boot mounted on a selected last 7, when the plastic composition is subjected to pressure in a subsequent step. The insert or inserts may consist of cork, wood, felt or another suitable substance.

By rotating the lever 10 through a given angle, a selected last 7 is caused to descend into the mold cavity in frame 11, it being understood that the upper part of a shoe or boot is already placed onto such a selected last 7 before the latter descends into the mold cavity. The lower last 7 is shown in such position in FIG. 1.

In the next step, a pressure medium is introduced into the cylinder space B to move the composite piston rod 19, 19a in upward direction and to thereby cause upward movements of plate 18, of heating device 17 and of ram 16, the latter entering from below into the frame 11 in a direction toward the underside of selected last 7. The plastic material in the mold cavity of frame 11 is thereby subjected to considerable pressure and is liquefied under the influence of heat and pressure. The high pressure and the ability of the plastic composition to become liquefied bring about a complete filling-in of the mold cavity.

Simultaneously with the upward movement of composite member 19, 19a, the piston 38, too, is moved in upward direction by the pressure medium introduced into cylinder space C until the plunger 39 comes into abutment with the lower end of sleeve 36. It will be noted that the stroke of rod 38 is smaller than that of composite rod 19, 19a.

After elapse of a predetermined period of time whose length differs in dependency upon the nature of the plastic composition in the mold cavity, and which is usually somewhere between 2 and 5 minutes, the strongly compressed composition must be allowed to expand in order to develop microscopic, individual, non-connected, closed pores. To that end, the pressure of the medium in cylinder space B is relaxed whereby the composition in the mold cavity, which has a natural tendency to expand, causes downward movements of ram 16, of rod 19, 19a and of plunger 23. The relaxation of pressure upon the heretofore highly compressed composition should occur at a slow rate which is attained, for example, by the provision of a buffer spring 29a operating between the upper end of piston rod 38 and a suitable stop in the bore of member 19a. Such arrangement prevents downward movements of ram 16 at a rate of speed higher than the speed at which the compressed plastic composition in the mold cavity expands. This is necessary since, if the movement of ram 16 in downward direction were such as to permit rapid expansion of the composition, the latter would be free to become disengaged from the shoe mounted on the selected last 7. In order to assist the expanding composition in bringing about movements of the ram 16 in downward direction against the force of resilient means 29a, a medium under relatively low pressure may be introduced through conduit 40 into the upper space A of cylinder 26. A relatively low pressure of such medium is considered sufficient since practically only frictional forces must be overcome during such movements of ram 16. The low-pressure medium may be supplied into space A over a suitable reducing valve or the like.

The extent of downward movement of ram 16 and of composite rod 19, 19a is limited by piston rod 38 and plunger 39 in dependency on the position of sleeve 36.

The latter thus constitutes means for adjusting the downward stroke of ram 16 in that it controls the extent of upward stroke of lower piston 39 in its cylinder 33. When the piston 39 is moved into abutment with the lower end of sleeve 36, the upper end of rod 38 extends above and beyond said sleeve and is in the path of member 19a, thus preventing ram 16 from returning into its starting position.

Since the medium in cylinder space C remains under high pressure and the medium filling the cylinder space a is under relatively low pressure, the diameter of plunger 39 may be considerably smaller than that of plunger 23. It will be readily understood that the diameters of plungers 23, 39 as well as the pressure of media introduced into cylinder spaces A and B must remain in a certain relationship in order to achieve optimum results during the above-described operation of the vulcanizer.

Due to the controlled downward movement of ram 16, the compressed plastic composition is permitted to increase its volume, i.e. to fill the enlarged mold space in frame 11. During such expansion, the composition develops the aforementioned independent closed pores in its body. After elapse of a predetermined period of time whose length again depends upon and varies with the nature of the plastic composition, the vulcanizing of the shoe or boot sole is completed. The period of time necessary for development of pores usually ranges somewhere between 6 and 12 minutes.

In the next step, the pressure of medium filling the cylinder space C is reduced whereby the ram 16 is free to return into the starting position of FIG. 1, and the frame 11 is thereupon opened by the aforementioned non-represented articulate or hydraulic means. Before the pressure of medium in cylinder space C is reduced, it is often preferred to first introduce a pressure medium into the cylinder space B to cause slight upward movement of the ram 16 which latter is thereupon returned into its original position as soon as the pressure of medium in cylinder space C is relaxed in order to restore the original volume of the cavity in frame or mold 11. The last 7 with a finished article of footwear thereon may be lifted by the lever 10 and thereupon rotated by lever 6a through about 180 degrees in order to move the other last 7 into position ready for a subsequent vulcanizing operation after a shoe or boot upper has been placed thereon. Means may be provided for normally closing the frame or mold 11 and for permitting opening of said frame by the aforementioned articulate or hydraulic means only when the ram 16 returns into its starting position of FIG. 1.

It will be appreciated that the plungers 23, 39 and their rods 19, 19a and 38 need not be in axial alignment. Thus, it is possible to dispose the two plungers at right angles with respect to each other in which case the retaining action of plunger 39 may be transmitted to plunger rod assembly 19, 19a over suitable intermediate elements such as inclined surfaces, eccentrics, hydraulically or pneumatically operated devices, or the like. In other words, the movements of plunger 39 may be radial with respect to plunger 23 and may be performed by plunger 39 between a first end position in which the composite rod 19, 19a is free to move away from the mold cavity and a second end position in which the rod 38 controls the downward movements of plunger 23 and hence the movements of ram 16.

Without further analysis the foregoing will so reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for forming soles of foamed plastic and for connecting the soles to articles of footwear which comprises, in combination: a mold defining a cavity and including a ram reciprocable in directions to alternately enlarge and reduce the volume of said cavity; at least one last; means for supporting said last and for moving same with respect to said mold; means for reciprocating said ram including a rod connected for movements with said ram; means for controlling the movements of said rod and of said ram in the direction to enlarge the volume of said cavity, said last mentioned means comprising a cylinder, a piston reciprocable in said cylinder, a second rod connected with said piston and coaxially aligned with said first mentioned rod, and means for introducing a pressure medium into said cylinder whereby to move said second rod in a direction toward said first mentioned rod and to thereby control the extent to which said first mentioned rod is movable in a direction to enlarge the volume of said cavity; and means for limiting the movements of said second rod in a direction toward said first mentioned rod.

2. An apparatus for forming soles of foamed plastic and for connecting the soles to articles of footwear which comprises, in combination: a mold defining a cavity and including a ram reciprocable in directions to alternately enlarge and reduce the volume of said cavity; at least one last; means for supporting said last and for moving same with respect to said mold; means for reciprocating said ram including a rod connected for movements with said ram; means for controlling the movements of said rod and of said ram in the direction to enlarge the volume of said cavity, said last mentioned means comprising a cylinder, a piston reciprocable in said cylinder, a second rod connected with said piston and coaxially aligned with said first mentioned rod, and means for introducing a pressure medium into said cylinder whereby to move said second rod in a direction toward said first mentioned rod and to thereby control the extent to which said first mentioned rod is movable in a direction to enlarge the volume of said cavity; and means for limiting the movements of said second rod in a direction toward said first mentioned rod comprising a sleeve adjustably fixed to and extending into said cylinder and into the path of said piston.

3. An apparatus for forming soles of foamed plastic and for connecting the soles to articles of footwear comprising, in combination, a support; at least one last adapted to support an article of footwear and mounted on said support; a mold defining a cavity into which said article of footwear is adapted to extend with the bottom part thereof and including a ram reciprocable to alternatively enlarge and reduce the volume of said cavity, said ram being movable from a first posiiton in which said cavity has a maximum volume to a second position in which said cavity has a minimum volume and back to a preselected intermediate position between said second and said first positions and from said intermediate position back to said first position, said ram being moved from said second to said intermediate position under the influence of the expanding foam plastic fed into the mold cavity and compressed during the movement of said ram from said first to said second position; means for moving said ram between said first and said second position and between said intermediate and said first position and including a cylinder closed at opposite ends thereof, a piston reciprocable in said cylinder in direction of movement of said ram, a piston rod fixed to said piston and projecting with opposite ends thereof through said opposite ends of said cylinder and being connected at one end thereof to said ram, and means for alternatively introducing pressure fluid into said cylinder to opposite sides of said piston; and arresting means for arresting return movement of said ram at said preselected intermediate position and including a second cylinder coaxial with said first mentioned cylinder, a second piston movable in said second cylinder, a second piston rod fixed to said second piston and coaxial with said first piston rod, said second piston rod having a free end located in the path of said first piston rod and movable toward and away from the other end of said first piston rod when said second piston is reciprocated, means for introducing pressure fluid to one side of said second piston so as to move said free end of said second piston rod toward said other end of said first piston rod, and adjusting means cooperating with said second piston to limit the movement of said free end of said second piston rod toward the other end of said first piston rod.

References Cited in the file of this patent

UNITED STATES PATENTS

| | | |
|---|---|---|
| 627,840 | Butterfield | June 27, 1899 |
| 1,515,475 | Goodwin | Nov. 11, 1924 |
| 1,563,096 | MacDonald | Nov. 24, 1925 |
| 1,994,278 | Halsall et al. | Mar. 12, 1935 |
| 2,478,790 | Stephens | Aug. 9, 1949 |
| 2,588,151 | Nelson et al. | Mar. 4, 1952 |
| 2,769,205 | Pfleumer | Nov. 6, 1956 |
| 2,878,523 | Hardy | Mar. 24, 1959 |